United States Patent [19]

Ogawa

[11] Patent Number: 5,073,790

[45] Date of Patent: Dec. 17, 1991

[54] POSITION SENSING DEVICE

[75] Inventor: Kimiaki Ogawa, Tokyo, Japan

[73] Assignee: Asahi Kogaku Kogyo Kabushiki Kaisha, Tokyo, Japan

[21] Appl. No.: 531,169

[22] Filed: May 31, 1990

[30] Foreign Application Priority Data

Jun. 6, 1989 [JP] Japan .................... 1-65924[U]

[51] Int. Cl.⁵ .............................................. G03B 13/00
[52] U.S. Cl. ................... 354/400; 354/439; 354/452; 354/271.1
[58] Field of Search ............... 354/400, 435, 439, 452, 354/437, 195.1, 195.11, 271.1, 274, 455, 401–409

[56] References Cited

U.S. PATENT DOCUMENTS 4,572,645 2/1986 Yoshida et al. .................. 354/435

FOREIGN PATENT DOCUMENTS 0076509 4/1983 European Pat. Off. .
0230560 8/1987 European Pat. Off. .
0294154 12/1988 European Pat. Off. .
1482797 8/1977 United Kingdom .
1484414 9/1977 United Kingdom .
2153583 8/1985 United Kingdom .
2157039 10/1985 United Kingdom .

Primary Examiner—L. T. Hix
Assistant Examiner—David M. Gray
Attorney, Agent, or Firm—Sandler, Greenblum & Bernstein

[57] ABSTRACT

A position sensing device including a pattern applied on an objected to be moved. The pattern is composed of a pulse or pattern generating portion and a base portion. The pulse generating portion is periodically and alternately provided with a first element corresponding to a first logic level and a second element corresponding to a second logic level. The base portion is provided with the first or second element having a length different from the length of the first or second element in the pulse generating portion.

11 Claims, 5 Drawing Sheets

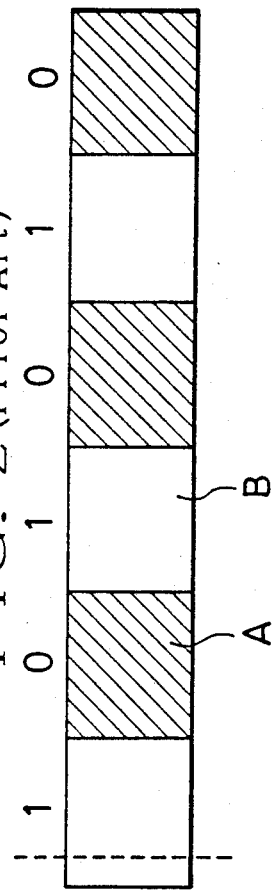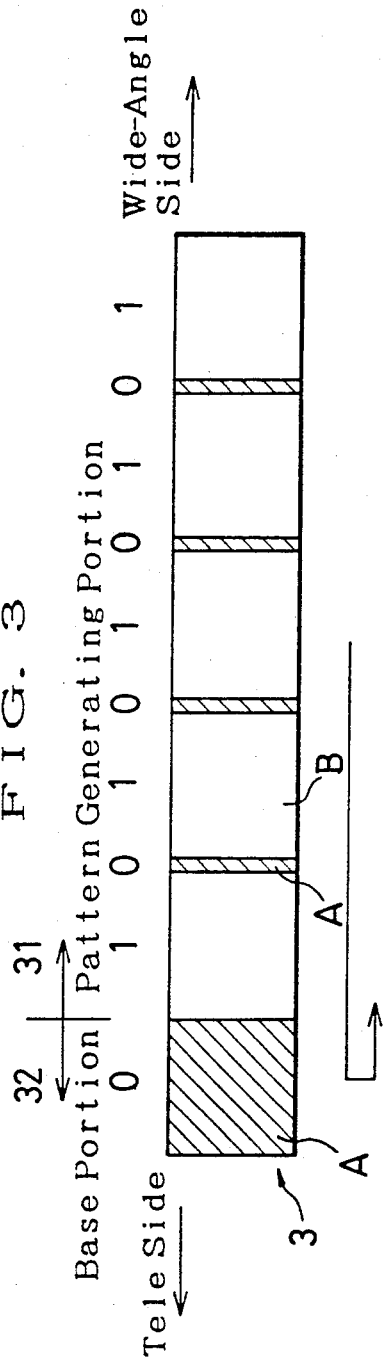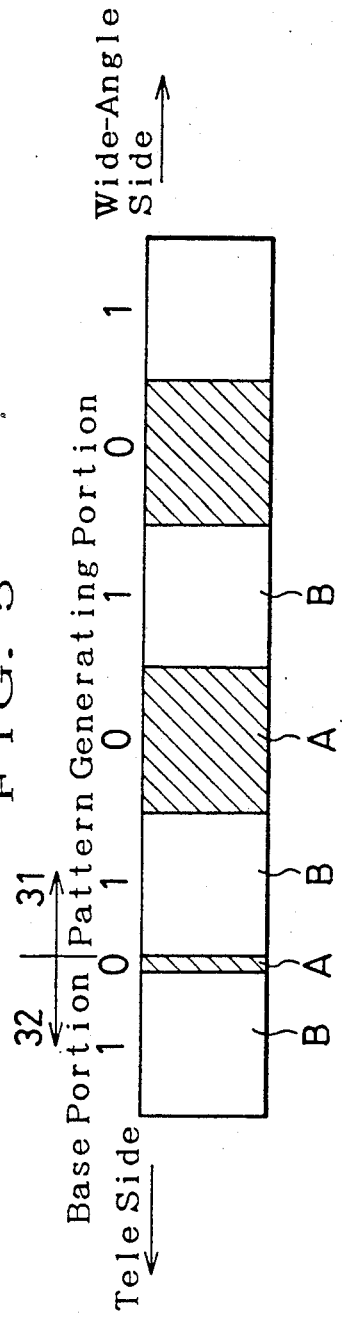

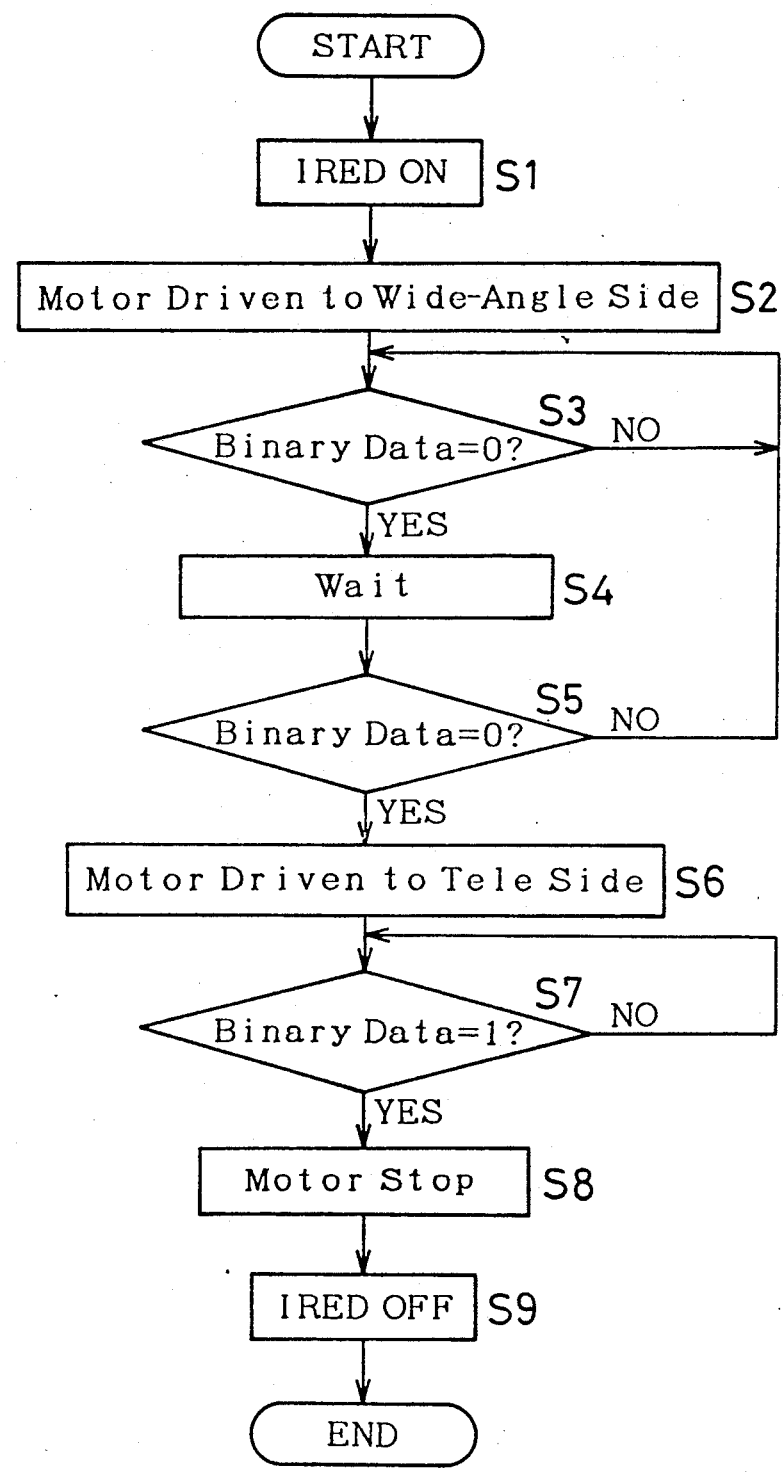

POSITION SENSING DEVICE

BACKGROUND OF THE INVENTION

1. Field of the Invention

The present invention relates to a position sensing device which senses the position of a moving object such as a drive ring provided in a camera, for example, to obtain optical data such as a focal length and the full-open aperture value of a lens.

2. Description of the Related Art

Recently, many cameras equipped with a power zoom lens have been developed. In a camera to which such a zoom lens is fitted, usually the full-open aperture value is changed in accordance with a focal length of the lens, and accordingly, to carry out an automatic exposure control in such a camera, the full-open aperture value must be sensed and input to the camera body. Further, in a camera in which an exposure program, for example, is changed in accordance with a focal length of the lens, data regarding the focal length of the lens must be input to the camera body.

Therefore, in a conventional device, the position of a zoom ring (a drive ring), which causes the zoom lens groups to move close to and apart from each other, is sensed and optical data such the a corresponding full-open aperture value and the focal length of the lens is obtained from the lens position data.

The movement of the zoom ring is sensed by counting the number of changes of a pattern, via a counter, in which periodically varied codes are given to the entire range of movement of the zoom ring.

FIG. 2 shows a plan view of an example of a pattern of a conventional device. As shown in the drawing, in this pattern, a first element A absorbing or cutting off a beam and a second element B reflecting or transmitting a beam, each having a same length and size are alternately and repetitiously arranged on and move integrally with the zoom ring. Accordingly, if a photo reflector and a photo interrupter are provided, to apply a beam to the pattern and receive a reflected or transmitted beam, therefrom the amount of light received from the first element A is low, and the amount of light received from the second element B is high. Thus, the position of the zoom ring is sensed by counting the number of changes in the amount of light received, from a base position.

As described above, since the conventional device senses only the number of changes of the amount of light reflected by the pattern, from the base position, a base switch, such as microswitch must be provided at the base position, to determine the base position. Therefore, not only is the construction thereof complicated, but the device is also bulky and expensive.

Further, due to a poor contact with or corrosion of the base switch, reading errors may occur.

SUMMARY OF THE INVENTION

Therefore, an object of the present invention is to provide a position sensing device by which an accurate and precise sensing of the position of a moving object is carried out, and at the same time, the construction thereof is simplified, and the device is inexpensive and small.

According to the present invention, there is provided a position sensing device comprising a pattern provided on a line along which the moving object is moved. The pattern has a pulse generating portion which is periodically and alternately provided with a first element corresponding to a first logic level and a second element corresponding to a second logic level. The pattern is moved in association with the moving object, a mechanism for sensing the first and second elements of the pattern, and a mechanism for counting signals output by the sensing means to determine a position of the moving object are provided. The pattern further has a base portion provided with the first or second element having a different length from the first or second element provided in the pulse generating portion.

In the device having the above-described construction, the sensing mechanism is constructed as a photo reflector, for example. A light beam is radiated from a beam source onto the pattern, and the beam is transmitted through or reflected by the pattern and received by a photo detector. Since the pattern is periodically and alternately provided with the first element formed of light transmitting material or a reflecting material and the second element formed of a light interrupting material or an absorbing material, the position of a moving object, such as a drive ring of a camera is sensed, for example, by counting the changes of signals output by the photo detector.

The length of the first element or the second element of the base portion of the pattern is longer or shorter than the first element or the second element of the pulse generating portion, and accordingly, the base portion is detected based upon the difference in the length therebetween.

Therefore, according to the present invention, the position of a moving object can be accurately and precisely sensed. Thus, since a base switch becomes unnecessary, the construction can be simplified and the device can be made smaller and less expensive.

BRIEF DESCRIPTION OF THE DRAWINGS

The present invention will be better understood from the description of the preferred embodiments of the invention set forth below, together with the accompanying drawings, in which:

FIG. 2 is a schematic plane view of a prior art pattern

FIG. 3 is a schematic extended plan view of a pattern according to an embodiment of the present invention;

FIG. 4 is a flow chart showing an initializing operation of the embodiment shown in FIG. 1;

FIG. 5 is a schematic extended plan view of a pattern according to another embodiment of the present invention;

DESCRIPTION OF THE PREFERRED EMBODIMENTS

Figure 1:
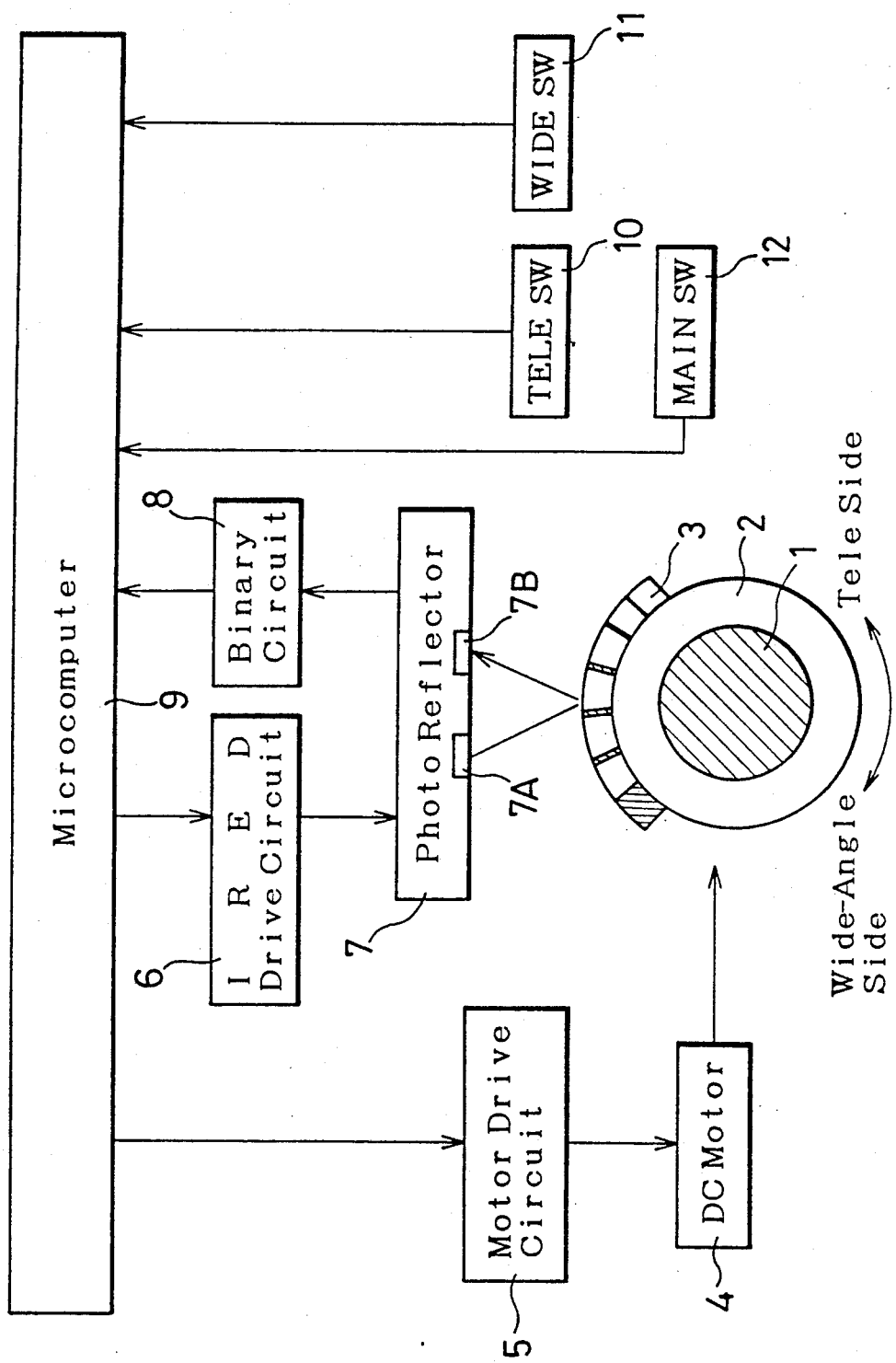
FIG. 1 is a block diagram showing a construction of a lens data reading device according to an embodiment of the present invention.

The present invention will now be described with reference to embodiments shown in the drawings.

FIG. 1 is a block diagram showing a construction of an embodiment in which a lens data reading device is applied to an electric still camera.

In the Figure, a zoom lens 1 is fitted with a lens ring 2 which acts as a drive ring and which is rotated to move the lens groups provided in the zoom lens 1.

Namely, the zoom lens 1 is constructed in such a manner that zoom lens groups are moved by a rotational motion of the lens ring 2, i.e., the drive ring, relatively close to and apart from each other along the optical axis thereof, to carry out a zooming operation. This lens ring 2 is driven by a DC motor 4, which is driven by a motor drive circuit 5, to rotate in the clockwise and counterclockwise directions and thereby move the zoom lens to a telephoto mode or a wide-angle mode.

A pattern 3 is applied on an outer surface of the lens ring 2, for sensing a stopped position of the lens ring 2. The pattern 3 is provided along a direction of rotation of the lens ring 2 and in a range covering the range of rotation of the lens ring 2, and as described later, is composed of periodically and alternately arranged first elements and second elements.

A sensing portion, i.e., a photo reflector 7, includes an infrared ray radiation diode (IRED) 7A and a photo detector 7B. An IRED drive circuit 6 drives the infrared ray radiation diode (IRED) 7A, and a binary circuit 8 carries out a wave-shaping of signals output by the photo detector 7B, transforms the output signals to binary data, and outputs the binary data to a microcomputer 9 acting as a counter.

A telephoto switch 10 and a wide-angle switch 11 are connected to the microcomputer 9, as switches for carrying out a zooming operation of the zoom lens 1. The telephoto switch 10 moves the zoom lens 1 toward the telephoto side, and the wide-angle switch 11 moves the zoom lens 1 toward the wide-angle side. A main switch 12 is connected to the microcomputer 9 and is operated when a power supply for the device is turned ON or OFF.

FIG. 3 shows a schematic plane view of the pattern 3. As seen from the Figure, the pattern 3 is composed of a pattern generating portion 31 and a base portion 32, and as shown in the Figure, a plurality of first elements A absorbing a light beam and second elements B reflecting a light beam are periodically and alternately formed on the pattern generating portion 31. In this embodiment, the first element A is shorter than the second element B.

The base portion 32 comprises the first element A (or the second element B), the length of the first element A of the base portion 32 being longer than that of the first elements A of the pulse generating portion 31.

The operation of the device shown in FIG. 1 is described below with reference to the flow chart shown in FIG. 4.

As shown in the flow chart, when the main switch 12 is turned ON and electric power is supplied to each circuit or device (START), the microcomputer 9 initializes the control of the drive circuit 6 and the infrared ray radiation diode (IRED) 7A, i.e., a light source, is turned ON (STEP S1).

The microcomputer 9 also drives the DC motor 4 through the motor drive circuit 5, so that the zoom ring 2 is driven in a predetermined initializing direction (STEP S2). In this embodiment, the initializing direction is toward the wide-angle side (clockwise in FIG. 1).

Then, a light beam is radiated from the infrared ray radiation diode 7A onto the pattern 3, and the beam is reflected from the pattern 3 and received by the photo detector 7B. The pattern 3 is rotated integrally with the zoom ring 2, and thus the position to which the light beam is radiated is gradually changed. The amount of light beam reflected by the first element A is less than that reflected by the second element B, and therefore, a signal output by the photo detector 7B is changed in accordance with changes of the amount of light beam reflected from the first element A and from the second element B.

The binary circuit 8 transforms the signal output by the photo detector 7B to a binary signal; for example, a signal output for the first element A corresponds to a logic level "0", and a signal output for the second element B corresponds to a logic level "1". This binary data is input to the microcomputer 9.

The microcomputer 9 monitors the data, and when the data is at the logic level "0", waits for a predetermined time (STEP S3 and STEP S4). This waiting time is slightly longer than a time corresponding to the length of the first element A in the pulse generating portion 31.

Namely, the zoom ring 2, i.e., the pattern 3, is now being moved at a constant speed by the DC motor 4, and as a result, if the beam is radiated on the pulse generating portion 31 of the pattern 3, when the predetermined time has passed, the position on which the beam is radiated is again moved from the first element A to the second element B. Therefore, after the predetermined time has passed, if the logic level of the input data is again determined, the logic level of the data is "1". In this case, the process after STEP S3 is repeated (STEP S5).

Thus, if the pattern 3 is moved to the wide-angle side, i.e., to the right in FIG. 3, the point onto which the beam impinges is moved relatively over the pattern 3 to the tele side, i.e. to the left in the Figure.

When the beam radiating point reaches the base portion 32, since the length of the first element A (logic level "0") is longer than that of the first element A of the pulse generating portion 31, the data remains at the logic level "0" after the predetermined time has passed.

At this time, the microcomputer 9 controls the motor drive circuit 5 to rotate the DC motor 4 in the reverse direction (the tele side) (STEP S6). Then, when the logic level of the data is changed to "1", the drive of the zoom ring 2 is stopped, and the infrared ray radiating diode 7A is turned OFF (STEP S7, STEP S8, STEP S9).

Namely, as shown in FIG. 3, the radiating point is moved to the left in the drawing and enters the base portion 32. Thereafter, the radiating point is moved to the right, and is stopped when entering the second element B adjacent to the base portion 32.

This stopped position is the base position, and thereafter, the zoom ring 2 is driven from the base position to the tele side. Accordingly, the position of the zoom ring 2 is determined by counting the number of changes between the logic levels "1" and "0" from the base position, by the microcomputer 9.

FIG. 5 shows a construction of another embodiment of the pattern 3 of the present invention.

In this embodiment, the lengths of the first element A and the second element B in the pulse generating portion 31 are the same, but the length of the first element A of the base portion 32 is shorter than that of the first element A of the pulse generating portion 31.

Figure 6:
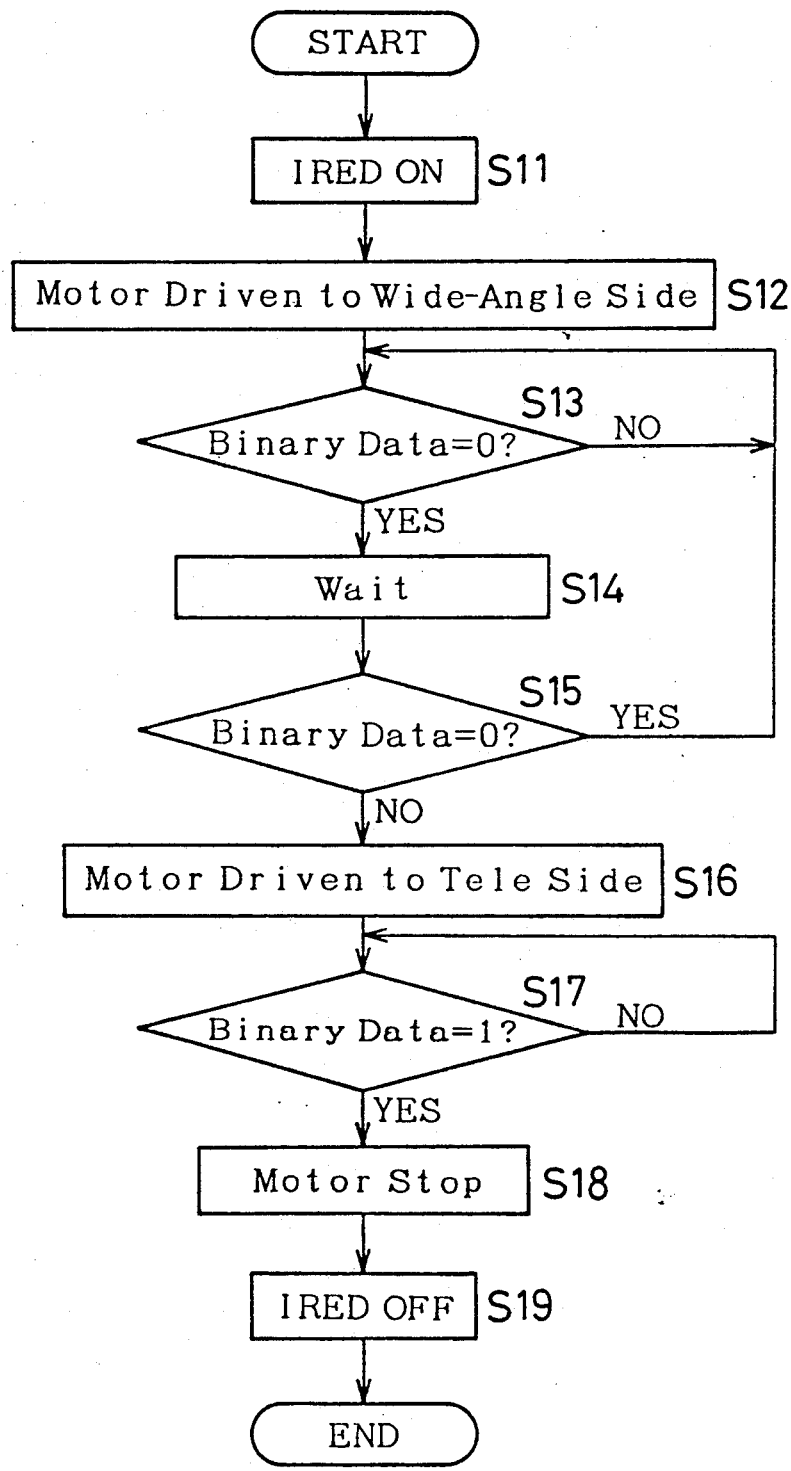
FIG. 6 is a flow chart showing an initializing operation of the embodiment shown in FIG. 5.

In this embodiment, the initialization process is carried out as shown in a flowchart of FIG. 6, and although the basic process is the same as the embodiment shown in FIG. 4, the waiting time in STEP S14 is set in accordance with the length of the first element A in the base portion 32. Further, in STEP S15, if the logic level is "0", the process returns to STEP S13, and if the logic level is "1", the process is moved to STEP S16. The other STEPs are the same as the embodiment shown in FIG. 4.

Namely, the base position is sensed by the following process. In the pulse generating portion 31, when the predetermined time has passed after the logic level "0" is sensed, the logic level remains "0". Conversely, in the base portion 32, when the predetermined time has passed after the logic level "0" is sensed, the logic level is changed to "1".

Figure 7:
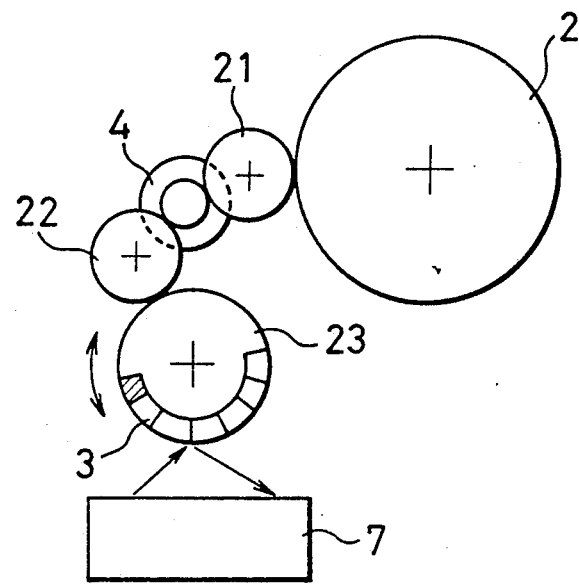
FIGS. 7 and 8 are front views showing other embodiments of the assembled construction of the pattern and the zoom ring in accordance with the present invention.
Figure 8:
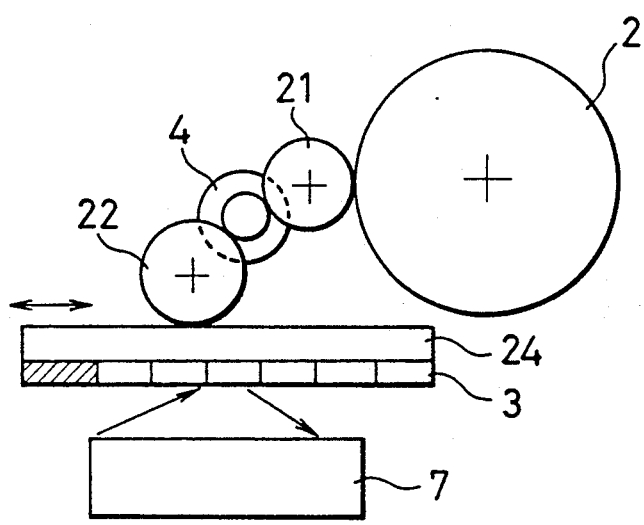

FIGS. 7 and 8 show other embodiments of the assembled construction of the zoom ring 2 and the pattern 3.

In the embodiment shown in FIG. 7, the rotation of the DC motor 4 is transmitted to the zoom ring 2 through a gear 21, and transmitted to a gear 23 through a gear 22. The pattern 3 is provided on the gear 23, and thus is rotated in association with the rotation of the zoom ring 2.

In the embodiment shown in FIG. 8, the pattern 3 is linear and is disposed on a rack 24. The rack 24 is driven by the DC motor 4 through the gear 22, and thus the pattern 3 is moved linearly in association with the movement of the zoom ring 2.

In the embodiments shown in FIGS. 7 and 8, the pattern 3 is moved in association with the zoom ring 2, and thus the position of the zoom ring 2 is sensed in accordance with the pattern 3.

Note, in the above embodiments the pattern is formed of a material which reflects a light beam and a material which absorbs the light beam, but this pattern can be formed of a material which transmits a light beam and a material which interrupts the light beam. In this case, the photo reflector is replaced by a photo interrupter and a photo coupler.

Further, in the above embodiment, although the pattern 3 is provided with optical codes, the pattern may be formed of a magnetic material or an electric material. Where the pattern 3 is formed by a magnetic material, the first element A and the second element B are given different magnetic capacities and where the pattern 3 is formed of an electric material, the first element A and the second element B are given different electric resistances.

According to the embodiments of the present invention, since the pattern moving in association with the zoom drive ring is provided with a pulse generating portion and a base portion, and the base portion is distinguished from the pulse generating portion, a base switch for sensing the base position of the drive ring can be omitted. Therefore, reading errors due to a poor contact and corrosion of the switch do not occur, and thus the position of the drive ring can be accurately and precisely sensed. Further, the device is made smaller and the cost thereof is reduced.

In the above description, the present invention is explained with reference to embodiments applied to a zoom lens, but the present invention can be also applied to a single focal light lens. Further, although the above description concerns a rotating zooming type zoom ring as a lens drive ring, the type of zooming system and the type of movement of the zoom ring, and whether it is a power zoom or a manual zoom, are not important. For example, the present invention can be applied to a linear zooming system in which a zoom ring moves linearly, or to a linear moving rotating type zoom ring.

Although the embodiments of the present invention have been described herein with reference to the accompanying drawings, obviously many modifications and changes may be made by those skilled in this art without departing from the scope of the invention.

I claim:

1. A device for sensing the position of a moving object, said device comprising:
    a pattern provided on a path along which said moving object is moved, said pattern having a pulse generating portion which is periodically and alternatively provided with a first element corresponding to a first logic level and a second element corresponding to a second logic level, said pattern further having a base portion comprising one of said first and second elements having a different length from said one of said first or said second elements provided in said pulse generating portions, said pattern being adapted for movement in two directions in association with said moving object;
    means for sensing said base portion and reversing the direction of movement of said pattern;
    means for establishing a base position between said base portion and said pulse generating portion of said pattern;
    means for sensing said first and said second elements of said pattern; and
    means for counting signals output by said sensing means after the establishment of said base position to thereby determine the position of said moving object.

2. A device according to claim 1, wherein said device is provided in a camera and said moving object is a drive ring fitted to a lens group and driven to move said lens group.

3. A device according to claim 1, wherein said pattern is on said moving object.

4. A device according to claim 1, wherein said pattern is rotated in association with said moving object.

5. A device according to claim 1, wherein said pattern is moved linearly in association with said moving object.

6. A device according to claim 1, wherein said base portion is provided with one of said first and said second elements having a length shorter than a length of said one of said first and said second elements provided in said pulse generating portion.

7. A device according to claim 1, wherein said base portion is provided with one of said first and said second elements having a length longer than a length of said one of said first and said second elements provided in said pulse generating portion.

8. A device according to claim 1, wherein said first element absorbs a light beam and said second element reflects a light beam.

9. A device according to claim 1, wherein said first and second elements are formed of a magnetic material.

10. A device according to claim 1, wherein said first and second elements are formed of an electric material.

11. A device according to claim 1, further comprising means for stopping said pattern in response to sensing one of said first and said second elements after the direction of motion of said pattern has been reversed.

* * * * *